(12) United States Patent
Lee et al.

(10) Patent No.: US 10,430,046 B2
(45) Date of Patent: Oct. 1, 2019

(54) ELECTRONIC DEVICE AND METHOD FOR PROCESSING AN INPUT REFLECTING A USER'S INTENTION

(71) Applicant: Samsung Electronics Co., Ltd., Gyeonggi-do (KR)

(72) Inventors: Sunkee Lee, Gyeonggi-do (KR); Yongjoon Jeon, Gyeonggi-do (KR); Geonsoo Kim, Gyeonggi-do (KR); Jingil Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 549 days.

(21) Appl. No.: 14/744,763

(22) Filed: Jun. 19, 2015

(65) Prior Publication Data
US 2015/0370452 A1    Dec. 24, 2015

(30) Foreign Application Priority Data
Jun. 20, 2014   (KR) ........................ 10-2014-0075472

(51) Int. Cl.
*G06F 3/0484*  (2013.01)
*G06F 3/0488*  (2013.01)

(52) U.S. Cl.
CPC ........ *G06F 3/04842* (2013.01); *G06F 3/0488* (2013.01)

(58) Field of Classification Search
CPC .... G06F 3/04842; G06F 3/0488; G06F 3/017; G06F 3/033; G06F 3/041; G06F 3/0416; G06F 3/0425; G06F 3/044; G06F 3/04883
See application file for complete search history.

(56) References Cited

U.S. PATENT DOCUMENTS

| 8,294,669 | B2 | 10/2012 | Partridge et al. |
| 10,185,464 | B2 * | 1/2019 | Pereira ................ G06F 3/04817 |
| 2004/0080528 | A1 * | 4/2004 | Rand ................. G06F 17/30017 715/738 |
| 2005/0146534 | A1 * | 7/2005 | Fong ..................... G06F 3/0219 345/619 |
| 2011/0283215 | A1 * | 11/2011 | Dunn .................... G06F 9/4443 715/771 |
| 2011/0285665 | A1 * | 11/2011 | Matsumoto ............. G06F 3/044 345/174 |
| 2012/0299862 | A1 * | 11/2012 | Matsumoto ........... G06F 3/0488 345/173 |
| 2014/0053066 | A1 * | 2/2014 | Imamura ............... G06F 3/0483 715/251 |
| 2014/0089099 | A1 * | 3/2014 | Money .................. G06F 3/0485 705/14.66 |
| 2014/0111460 | A1 * | 4/2014 | Lv ......................... G06F 3/0416 345/173 |

(Continued)

*Primary Examiner* — Justin R. Blaufeld
*Assistant Examiner* — Mong-Shune Chung
(74) *Attorney, Agent, or Firm* — The Farrell Law Firm, P.C.

(57) ABSTRACT

Disclosed is a method for controlling an electronic device, including switching an electronic document from a first electronic document to a second electronic document, receiving an input corresponding to an arbitrary position of the display, determining one of the first electronic document and the second electronic document as corresponding to the input; and selecting an object corresponding to the arbitrary position where the input is received, based on the determined electronic document.

18 Claims, 8 Drawing Sheets

(56) References Cited

U.S. PATENT DOCUMENTS

2014/0347273 A1* 11/2014 Arrasvuori ............ G06F 3/0412
                                                        345/158
2015/0215481 A1*  7/2015 Faust ................. H04N 1/00225
                                                        358/1.13

* cited by examiner

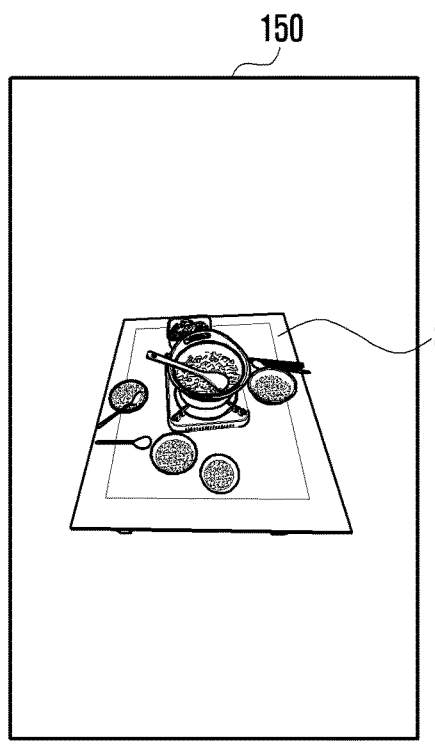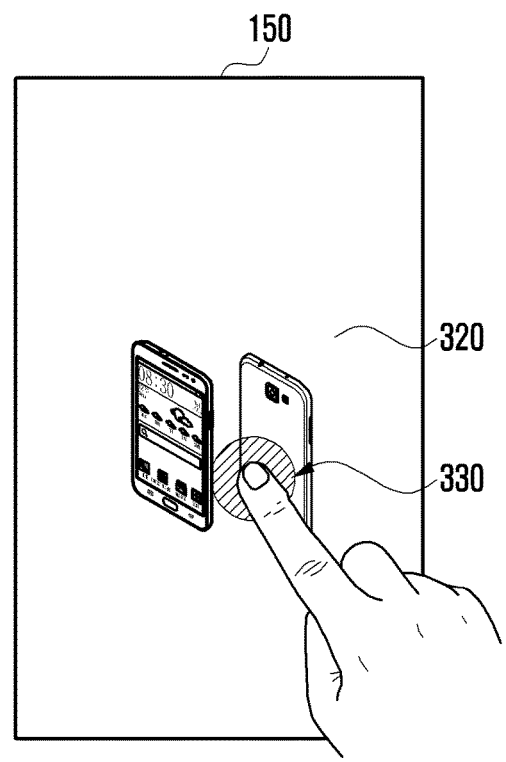
FIG. 3A
FIG. 3B

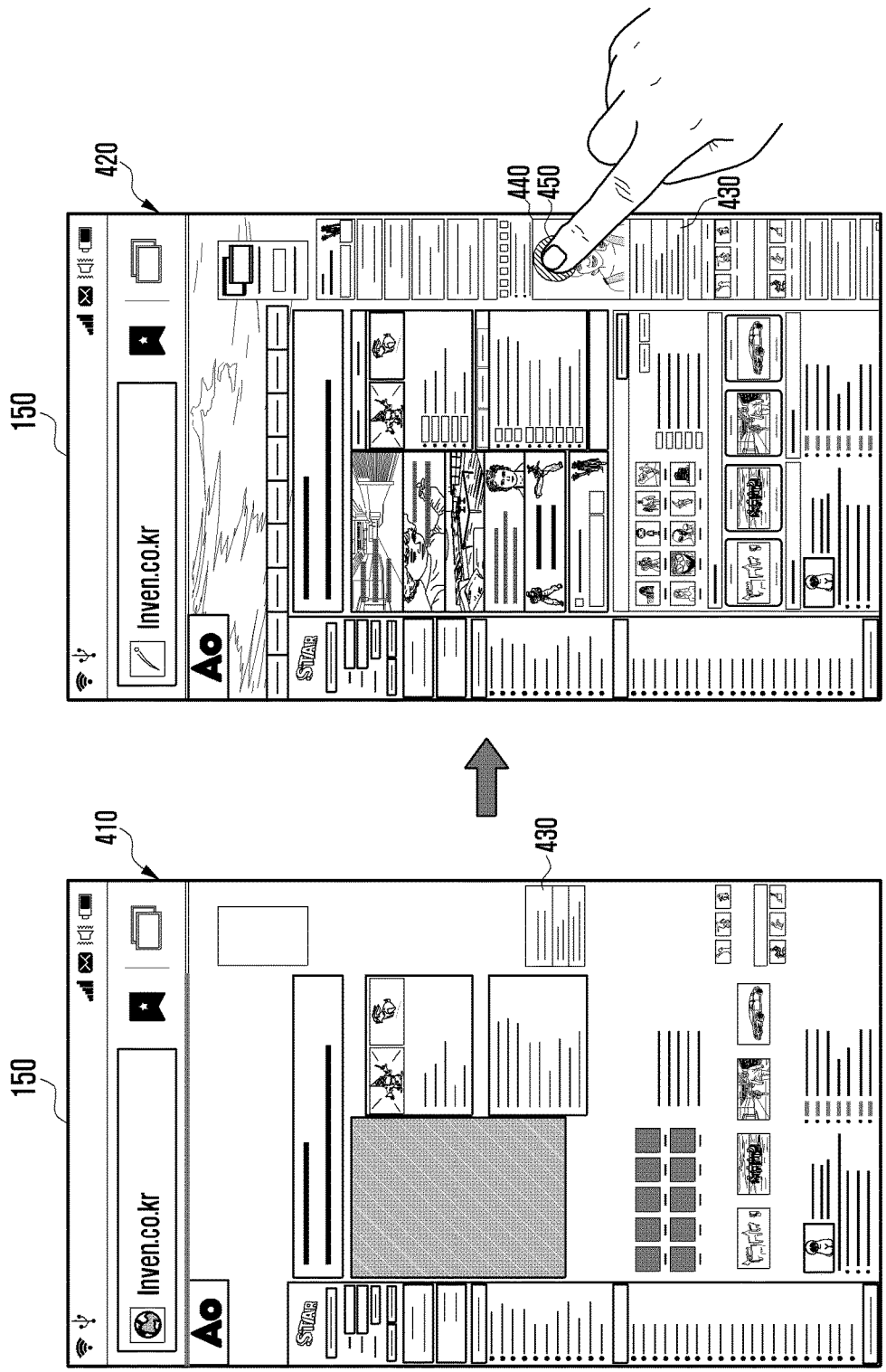

ELECTRONIC DEVICE AND METHOD FOR PROCESSING AN INPUT REFLECTING A USER'S INTENTION

PRIORITY

This application claims priority under 35 U.S.C. § 119(a) to Korean Patent Application No. 10-2014-0075472, filed in the Korean Intellectual Property Office on Jul. 20, 2014, the contents of which are incorporated herein by reference.

BACKGROUND OF THE INVENTION

1. Field of the Invention

The present invention relates to a control method capable of processing an input by reflecting a user's intention and an electronic device implementing the same.

2. Description of the Related Art

There has been a recent expansion in various services and functions provided by an electronic device such as a portable terminal. In order to increase the value of the portable terminal and meet various user demands, a variety of applications executable in the portable terminal have been developed.

Accordingly, hundreds of applications and various data may now be stored in a portable terminal, such as a smartphone, a mobile phone, a notebook Personal Computer (PC) and tablet PC, and can be displayed as a digital object through a display such as a touch screen of the portable terminal. The digital object can be controlled by an input unit such as a finger or stylus via a touch screen.

There may occur an instance where a screen to be output switches at the moment when a user provides an input selecting a particular object on the screen to be output through a display of an electronic device. When the screen switches, since the configuration and arrangement of the object can be changed, a problem occurs in which an object which is different from the object to be selected in response to the user's input, ends up being selected. Accordingly, there is a need in the art for an electronic device and method for preventing such an unintended selection.

SUMMARY OF THE INVENTION

The present invention has been made to address at least the above-mentioned problems and/or disadvantages and to provide at least the advantages described below. Accordingly, an aspect of the present invention is to provide a method for controlling an electronic device by processing an input reflecting a user's intention and the electronic device implementing the same.

In accordance with an aspect of the present invention, the method includes switching an electronic document, which is output through a display functionally connected to the electronic device, from a first electronic document to a second electronic document, receiving an input corresponding to an arbitrary position of the display, determining one of the first electronic document and the second electronic document as corresponding to the input, and selecting an object corresponding to the arbitrary position where the input is received, based on the determined electronic document.

In accordance with an aspect of the present invention, an electronic device includes a display that displays a first electronic document or a second electronic document, and an input processing control module that outputs the first electronic document through the display, switches the output from the first electronic document to the second electronic document, receives an input corresponding to an arbitrary position of the display, determines the first electronic document or the second electronic document as corresponding to the input, and selects an object corresponding to the arbitrary position where the input is received, based on the determined electronic document.

BRIEF DESCRIPTION OF THE DRAWINGS

The above and other objects, features and advantages of the present invention will be more apparent from the following detailed description in conjunction with the accompanying drawings, in which:

FIGS. 3A-3B illustrate screens of an object selection input reception with respect to an electronic document output from an electronic device according to an embodiment of the present invention;

FIGS. 4A-4B illustrate screens of an object selection input reception with respect to an electronic document output from an electronic device according to an embodiment of the present invention;

DETAILED DESCRIPTION OF EMBODIMENTS OF THE INVENTION

Figure 1:
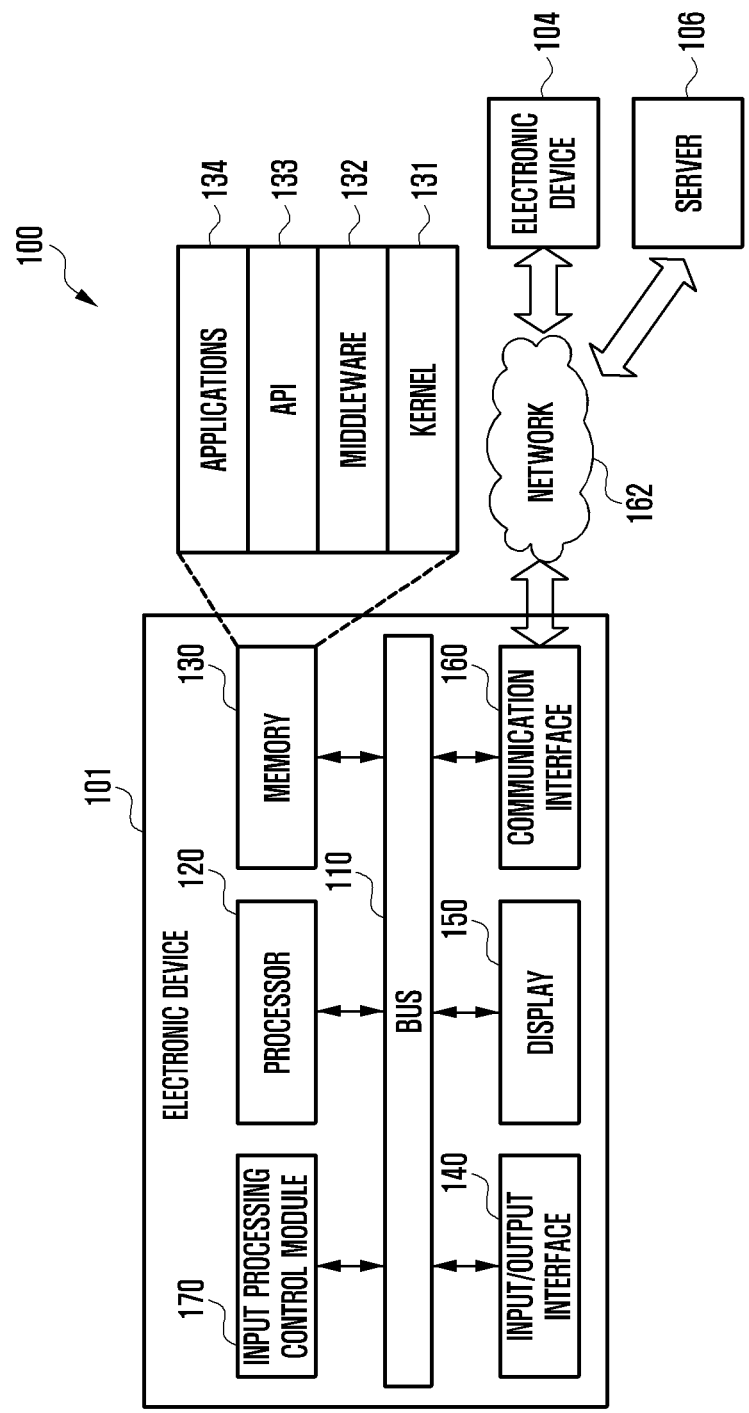
FIG. 1 illustrates a network environment that includes an electronic device according to an embodiment of the present invention.

Hereinafter, the present invention will be described with reference to the accompanying drawings. The present invention may have various embodiments, and modifications and changes may be made therein. Therefore, the present invention will be described in detail with reference to particular embodiments shown in the accompanying drawings. However, it should be understood that there is no intent to limit the present invention to the particular forms, and the present invention should be construed to cover all modifications, equivalents, and/or alternatives falling within the spirit and scope of the present invention. In describing the drawings, similar elements are designated by similar reference numerals. A detailed description of known functions and configurations which may make the subject matter of the present invention unclear will be omitted for the sake of clarity and conciseness.

As used in the present invention, the expression "include" or "may include" refers to the existence of a corresponding function, operation, or constituent element, and does not limit one or more additional functions, operations, or constituent elements. Terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present invention, the expression "or" includes any or all combinations of words enumerated together. For example, the expression "A or B" includes A, includes B, or includes both A and B.

While expressions including ordinal numbers, such as "first" and "second", as used in the present invention may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. A first constituent element may be termed a second constituent element, and likewise, a second constituent element may also be termed a first constituent element without departing from the scope of the present invention.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present invention are merely for the purpose of describing particular embodiments and are not intended to limit the present invention. Singular forms are intended to include plural forms unless the context clearly indicates otherwise.

Unless defined otherwise, all terms used herein, including technical terms and scientific terms, have the same meaning as commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present invention.

An electronic device according to the present invention may include a communication function. For example, the electronic device may include at least one of a smartphone, a tablet PC, a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted Device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. The smart home appliance as the electronic device includes at least one of a television, a Digital Video Disk (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic devices may include at least one of various medical devices (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sales (POS) in a shop.

According to some embodiments, the electronic device may include at least one of a part of furniture or a building/structure, an electronic board, an electronic signature receiving device, a projector, and various types of measuring instruments (e.g., a water meter, an electric meter, a gas meter, and a radio wave meter). The electronic device according to the present invention may be a combination of one or more of the aforementioned various devices, and may be a flexible device. It will be apparent to those skilled in the art that the electronic device according to the present invention is not limited to the aforementioned devices.

The term "a user" as used in embodiments herein may refer to any person who uses an electronic device or any other device (e.g., an artificial intelligence electronic device) using an electronic device.

FIG. 1 illustrates a network environment 100 including an electronic device 101 according to various embodiments of the present invention. Referring to FIG. 1, the electronic device 101 includes a bus 110, a processor 120, a memory 130, an input/output interface 140, a display 150, a communication interface 160, and an input processing control module 170.

The bus 110 may be a circuit interconnecting the aforementioned components and transmitting communication (e.g., a control message) between the aforementioned components.

The processor 120 receives instructions from the aforementioned components (e.g., the memory 130, the input/output interface 140, the display 150, the communication interface 160, and the input processing control module 170) other than the processor 120 through the bus 110, decodes the received instructions, and performs operations or data processing according to the decoded instructions.

The memory 130 stores instructions or data received from or generated by the processor 120 or other components (e.g., the input/output interface 140, the display 150, the communication interface 160, and the input processing control module 170). The memory 130 includes programming modules a kernel 131, middleware 132, an Application Programming Interface (API) 133, and applications 134. Each of the programming modules as described above may be formed by software, firmware, hardware, or a combination of two or more thereof.

The kernel 131 controls or manages system resources (e.g., the bus 110, the processor 120, and the memory 130) used to execute operations or functions implemented in the remaining other programming modules the middleware 132, the API 133, and the applications 134. The kernel 131 provides an interface that allows the middleware 132, the API 133, or the applications 134 to access and control or manage individual components of the electronic device 101.

The middleware 132 mediates between the API 133 or the applications 134 and the kernel 131, that is, allows the API 133 or the application 134 to communicate and exchange data with the kernel 131. The middleware 132 performs control (e.g., scheduling or load balancing) for task requests received from the applications 134 by using a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and includes at least one interface or function (e.g., instruction) for file control, window control, image processing, or text control.

According to various embodiments, the applications 134 include a Short Message Service/Multimedia Messaging Service (SMS/MMS), e-mail, calendar, alarm, health care (e.g., an application for measuring the amount of exercise or blood glucose), and an environmental information application (e.g., an application for providing atmospheric pressure information, humidity information, temperature information, and the like). The applications 134 may further include an application associated with information exchange between the electronic device 101 and external electronic device 104. The application associated with information exchange includes a notification relay application for transferring specific information to the external electronic device or a device management application for managing the external electronic device.

For example, the notification relay application includes a function of transferring notification information, generated in another application of the electronic device 101 (e.g., the SMS/MMS application, the e-mail application, the health care application, or the environmental information application), to external electronic device 104. The notification relay application may receive notification information from external electronic device 104 and provide the received notification information to a user. The device management application manages (e.g., installs, removes, or updates) a function for at least a part of external electronic device 104 communicating with the electronic device 101 (e.g., a function of turning on/off the external electronic device 104 (or some components thereof) or adjusting the brightness (or resolution) of a display), an application running on the external electronic device, or a service provided in the external electronic device (e.g., a calling or messaging service).

According to various embodiments, the applications 134 include an application specified according to the attribute (e.g., type) of external electronic device 104. For example, when the external electronic device 104 is an MP3 player, the applications 134 include an application associated with music playback. Similarly, when the external electronic device 104 is a mobile medical device, the applications 134 include an application associated with health care. According to an embodiment, the applications 134 include at least one of an application assigned to the electronic device 101 and an application received from an external electronic device (e.g., the server 106 or the external electronic device 104).

The input/output interface 140 transfers instructions or data, input from a user through an input/output device (e.g., a sensor, a keyboard, or a touch screen), to the processor 120, the memory 130, the communication interface 160, or the input processing control module 170 through the bus 110. For example, the input/output interface 140 provides the processor 120 with data corresponding to a user's touch input through a touch screen. The input/output interface 140 receives instructions or data from the processor 120, the memory 130, the communication interface 160, or the input processing control module 170 through the bus 110 and outputs the received instructions or data through the input/output device (e.g., a speaker or a display). For example, the input/output interface 140 outputs voice data processed by the processor 120 to a user through a speaker.

The display 150 displays various pieces of information (e.g., multimedia data or text data) to a user.

The communication interface 160 establishes communication between the electronic device 101 and an external electronic device (e.g., the electronic device 104 or the server 106). For example, the communication interface 160 may be connected to the network 162 through wireless or wired communication and thereby communicate with the external device. The wireless communication includes at least one of Wireless Fidelity (Wi-Fi), Bluetooth® (BT), Near Field Communication (NFC), GPS, and cellular communication (e.g., Long Term Evolution (LTE), LTE-Advanced (LTE_A), Code Division Multiple Access (CDMA), Frequency Division Multiple Access (FDMA), Universal Mobile Telecommunications System (UMTS), WiBro, or Global System for Mobile Communications (GSM)). The wired communication includes at least one of a Universal Serial Bus (USB), a High Definition Multimedia Interface (HDMI), recommended standard 232 (RS-232), and a Plain Old Telephone Service (POTS).

According to an embodiment, the network 162 is a telecommunications network including at least one of a computer network, the Internet, the Internet of Things (IoT, and a telephone network. According to an embodiment, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

According to various embodiments, the server 106 supports driving of the electronic device 101 by performing at least one operation (or function) implemented by the electronic device 101.

The input processing control module 170 processes at least a part of the information obtained from other components (for example, the processor 120, the memory 130, the input/output interface 140, or the communication interface 160, etc.) and provides the processed information to a user in various manners. For example, when an input for selecting the object is received from a user when the screen to be output via a display 150 switches from a first electronic document to a second electronic document, the input processing control module 170, can select the object reflecting the user's intention by using the processor 120 or independently from the input. For example, when the input for selecting the object is received while the first electronic document is output as well as when the input for selecting the object is received within a predetermined time after the output is switched to the second document, the input processing control module 170 can process the input for selecting the object by identifying the input as provided by the user with respect to the first electronic document. In such a case, based on the first electronic document, the input processing control module 170 selects the object corresponding to an arbitrary position where the input for selecting the object is received.

When the input for selecting the object is received past a predetermined time after the output is switched to the second document, the input processing control module 170 can process the input for selecting the object by identifying the input as provided by the user with respect to the second document. In such a case, based on the second electronic document, the input processing control module 170 selects the object corresponding to an arbitrary position where the input for selecting the object is received.

According to an embodiment, the input processing control module 170 stores information associated with the first electronic document in a memory 130, and processes the input for selecting the object by using the stored information when the input for selecting the object is determined to be the input with respect to the first electronic document. The information associated with the electronic document includes at least one out of a source code of the electronic document, information associated with the object that configures the electronic document, or rendering information that displays an electronic document on a screen.

Figure 2:
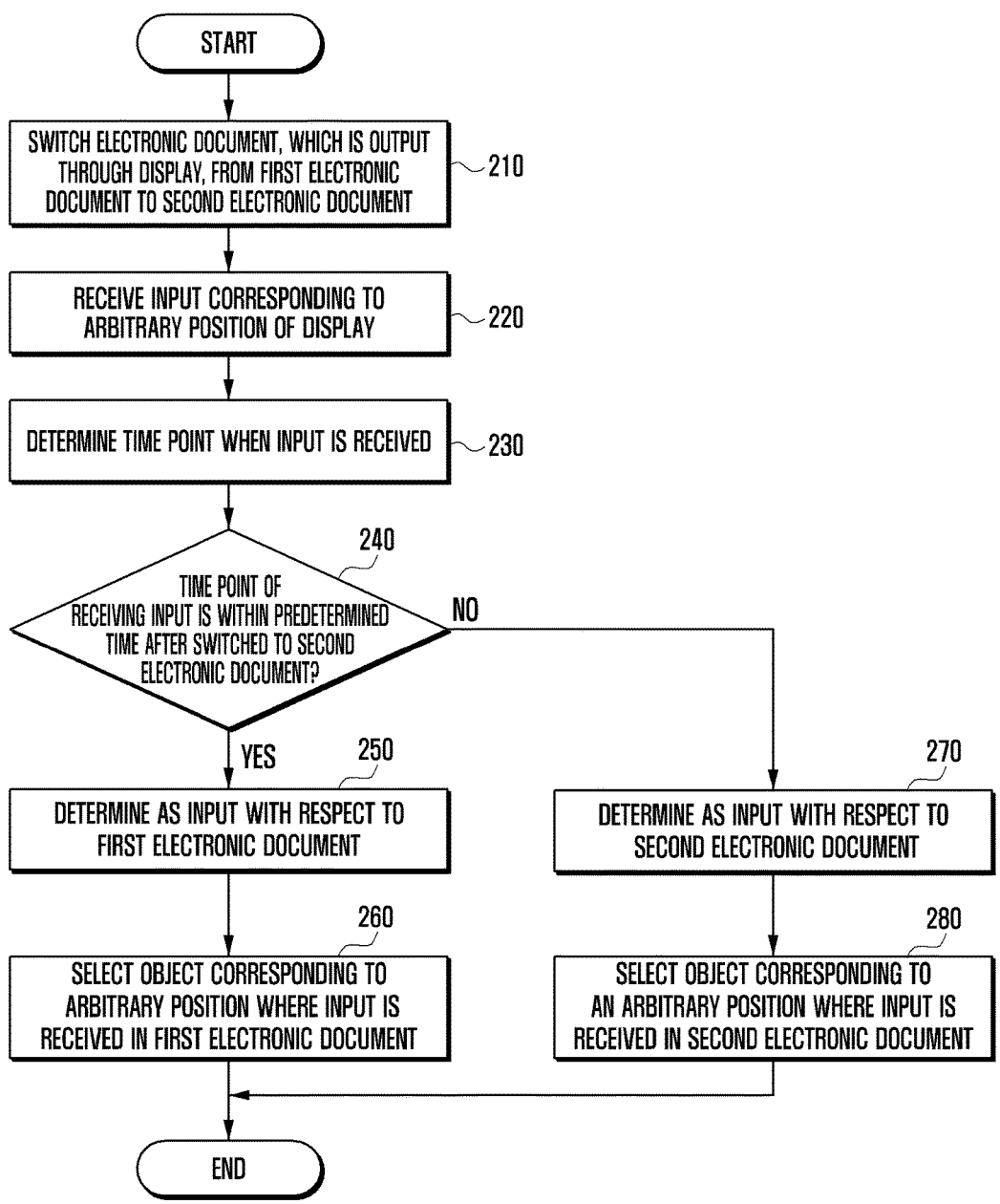
FIG. 2 illustrates a method for controlling an input process of an electronic device according to an embodiment of the present invention.

FIG. 2 illustrates a method for controlling an input process of an electronic device 101 according to an embodiment of the present invention.

In step 210, the electronic device 101 outputs the first electronic document through the display 150 and then switches the output to the second document. The electronic document according to various embodiments of the present invention may be referred to as a variety of applications run by the electronic device 101. Examples of the switching of the output of the electronic document includes when the first image which has been output through the display 150 switches to the second image, when a page of the Internet browser is switched, and when the screen switches from being loaded to loading completion when a page of the Internet browser is loaded. The switching of the electronic document to be output may be performed by an external input such as a user input, and may also be performed by an input according to an internal set.

In step 220, the electronic device 101 receives an input for selecting an object corresponding to an arbitrary position of the display 150. Such an input for selecting an object may also be received by a touch input through a touch screen, or received via the various input means such as a keyboard or mouse.

In step 230, the electronic device 101 determines the time point when the input for selecting the object is received, such as with reference to the time point when the output of the first electronic document is switched to the second electronic document.

In step 240, the electronic device 101 determines whether the time point when the input for selecting the object is received is within a predetermined time after the output is switched to the second electronic document. Step 240 is performed to identify whether the input provided by the user is intended with respect to the first electronic document or to the second electronic document. For example, when the input is provided by the user with respect to the first electronic document, a case may occur where the input has been provided by the user with respect to the second electronic document due to a sudden switch of the screen. In such a case, in order to prevent the input from being processed differently from the user's intention, the input processing control module 170 according to the present embodiment, can process the input with respect to the first electronic document when the input for selecting the object is received within a predetermined time after the output is switched to the second electronic document. A predetermined time can be set in consideration of human recognition and reaction rate, for example.

In step 250, when the input for selecting the object is received within a predetermined time after the output is switched to the second electronic document, the input processing control module 170 determines the input for selecting the object to be the input with respect to the first electronic document. In step 260, the input processing control module 170 selects the object corresponding to an arbitrary position where the input for selecting the object is received in the first electronic document.

In step 270, when the input for selecting the object is received past a predetermined time after the output is switched to the second electronic document, the input processing control module 170 determines the input for selecting the object to be the input with respect to the second electronic document. In step 280, the input processing control module 170 selects the object corresponding to an arbitrary position where the input for selecting the object is received in the second electronic document.

The electronic device 101 may execute the function corresponding to the relevant object when the object is selected. For example, the object may be a link object which, when selected, causes the electronic device 101 to output a third electronic document which corresponds to the link through the display 150.

FIGS. 3A-3B illustrate screens of an object selection input reception with respect to an electronic document output from an electronic device 101 according to an embodiment of the present invention.

Referring to FIG. 3A, the electronic device 101 outputs a first image 310 via the display 150. The first image includes advertisement banners. The user provides an input for selecting an object with respect to the first image 310 in order to obtain detailed information with respect to the first image 310. However, as shown in FIG. 3B, the screen which is output through the display 150 may instantaneously switch to a second image 320. Therefore, the electronic device 101, differently then the user's intention, detects an object selection input 330 of the user on the second image 320. According to an embodiment of the present invention, however, if the time point when the object selection input 330 is detected is within a predetermined time after the output is switched to the second image 320, the input processing control module 170 aprocesses the object selection input 330 as the input with respect to the first image 310. Therefore, the electronic device 101 provides information associated with the first image 310 through the display 150, by viewing the object selection input 330 as the input with respect to the first image 310. Accordingly, the intended user acquires the specific information with respect to the first image 310.

FIGS. 4A-4B illustrate screens of an object selection input reception with respect to an electronic document output from an electronic device 101 according to an embodiment of the present invention.

FIGS. 4A-4B illustrate a process of page switching when the Internet browser is running. For example, a screen before page switching or a screen on which the page loading is in progress may be identified as the first electronic document, and the screen on which the page loading is in progress or the screen on which the loading has been completed may be identified as the second electronic document.

Referring to FIG. 4A, the user provides the object selection input with respect to the first object 430 in order to acquire information linked to the first object 430 in the screen 410 on which the page loading of the Internet browser is in progress. However, as shown in FIG. 4B, when the page loading of the Internet browser is in progress or completed the output can be switched to the screen 420 on which the page loading has been completed. Therefore, contrary to the user's intention, the electronic device 101 detects an object selection input 450 of the user on the second object 440 which corresponds to the position where the object selection input 450 is provided in the screen 420 on which the loading has been completed.

According to an embodiment of the present invention, however, if the time point when the object selection input is detected is within a predetermined time after switched to the screen 420 on which loading has been completed, the input processing control module 170 processes the input with respect to the screen 410 on which the loading is in progress. Accordingly, the electronic device 101 processes the input with respect to the first object 430 which corresponds to a position where the object selection input 450 is provided, in the loading screen 420. The electronic device 101 provides the information which is linked to the first object 430 through the display 150. Accordingly, the user acquires information linked to the first object 430, as intended.

Figures 5A, 5B:
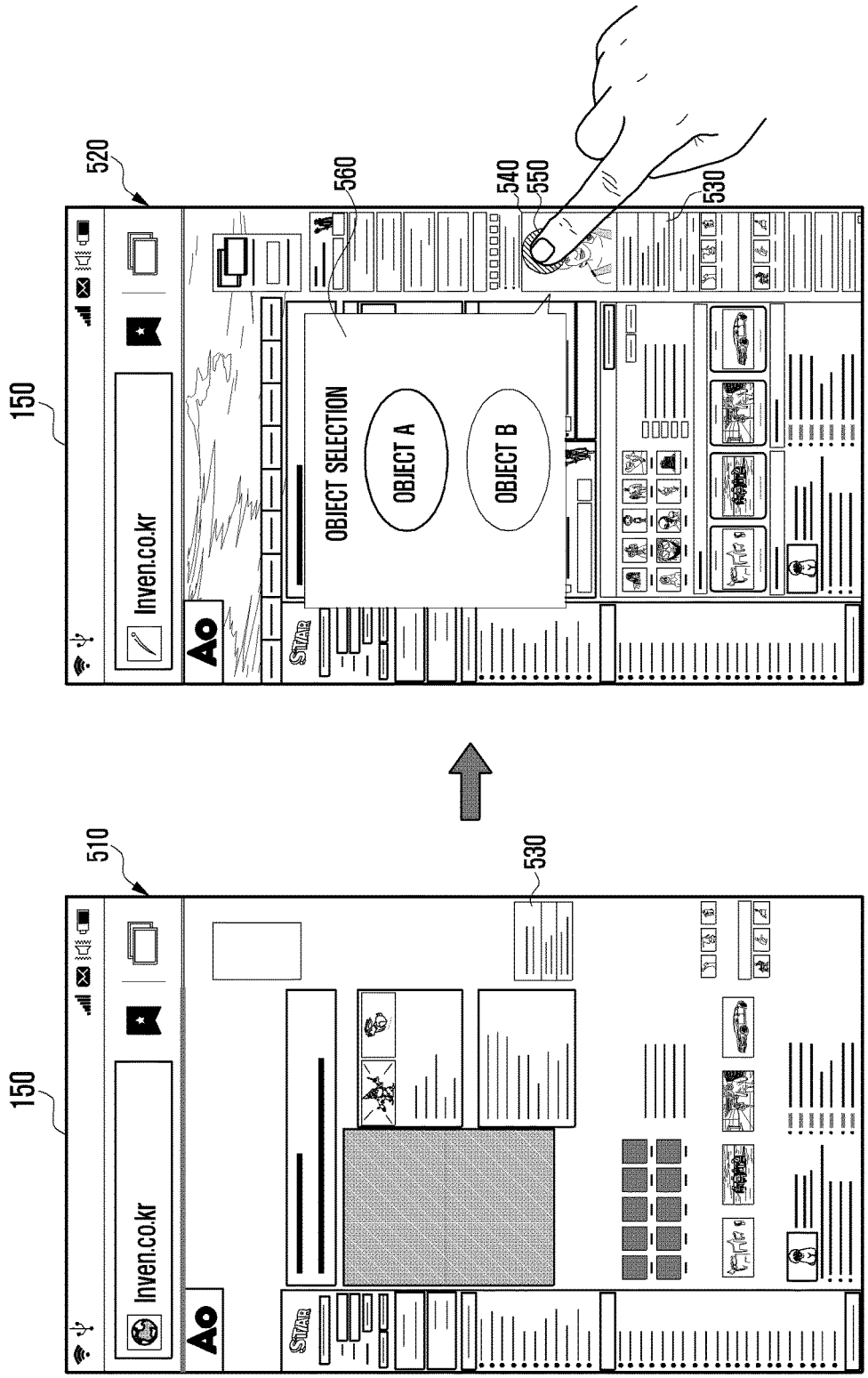
FIGS. 5A-5B illustrate screens of an object selection input reception and an input processing with respect to an electronic document output from an electronic device according to an embodiment of the present invention.

FIGS. 5A-5B illustrate screens of an object selection input reception and an input processing with respect to an electronic document output from an electronic device 101 according to an embodiment of the present invention.

The embodiment of FIGS. 5A-5B is similar to the embodiment shown in FIGS. 4A-4B and relates to a method for processing an input for selecting an object when the page loading of the Internet browser is instantaneously progressed and completed, despite that the user provided the input for selecting the object with respect to a screen 510 on which the page loading of the Internet browser was in progress.

Referring to FIG. 5A, the user provides the object selection input with respect to the first object 530 in order to acquire information linked to the first object 530 in the screen 510 on which the page loading of the Internet browser is in progress. However, as shown in FIG. 5B, when the page loading of the Internet browser is instantaneously in progress or completed the output can be switched to the screen 520 on which the page loading has been completed. Therefore, contrary to the user's intention, the electronic device 101, in the screen 520 on which the loading has been completed, detects an object selection input 550 of the user on the second object 540 which corresponds to the position where the object selection input 550 is provided.

According to an embodiment of the present invention, however, if the time point when the object selection input is detected is within a predetermined time after switched to the loading completion screen 520, the input processing control module 170 provides a menu 560 through the display 150, in which the menu 560 determines whether the object selection input relates to the first object 530 (for example, object A) of the screen 510 on which the loading is in progress, or relates to the second object 540 (for example, object B) of the screen 520 on which the loading has been completed. That is, if it is unclear to which screen the object selection input relates, the electronic device 101 can receive a distinct user selection by outputting the menu 560. The user can identify information linked to the relevant object by selecting an object as intended by the user on the menu 560.

Figure 6:
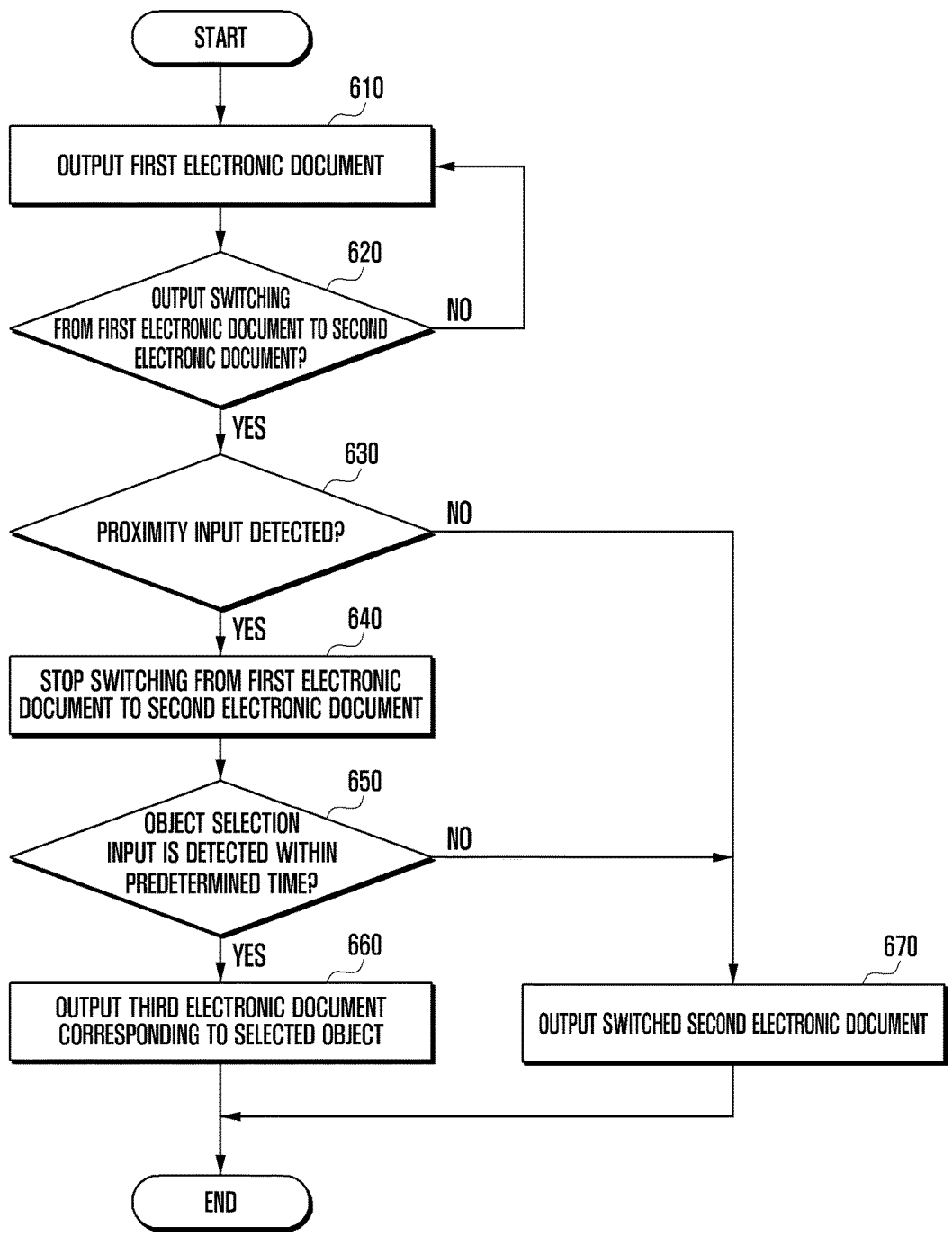
FIG. 6 illustrates a method for controlling an electronic device according to another embodiment of the present invention.

FIG. 6 illustrates a method for controlling an electronic device according to another embodiment of the present invention.

In step 610, the electronic device 101 outputs a first electronic document through a display 150. In step 620, the electronic device 101 determines whether the output is switched from the first electronic document to the second electronic document. In step 630, if it is determined that the output is switched, the electronic device 101 determines whether a proximity input is detected via a display such as a touch screen. The proximity input includes a hovering input, and may be a touch input which is farther away from the display 150 than the object selection input which is a direct touch input, on the display 150. In step 640, when the proximity input is detected, the electronic device 101 stops a switching operation from the first electronic document to the second electronic document.

Figure 7:
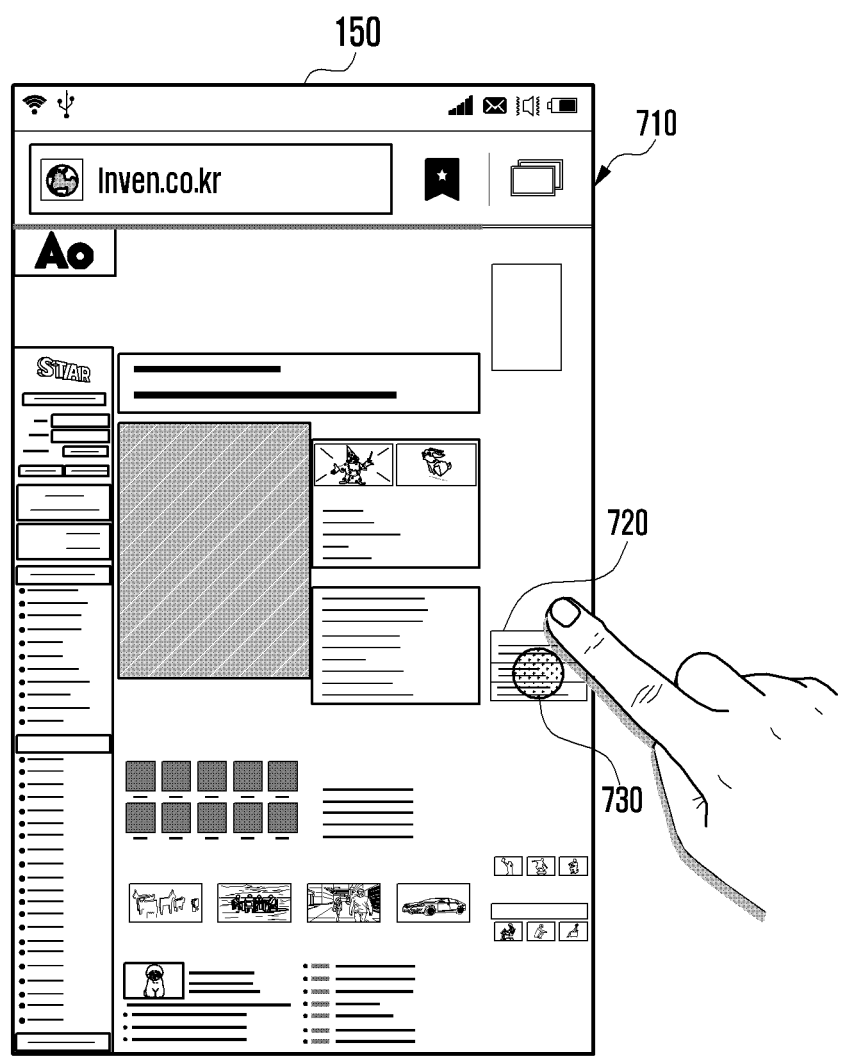
FIG. 7 is an diagram illustrating a screen of controlling method for an electronic device according to another embodiment of the present invention.

For example, referring to FIG. 7, if the first electronic document is a screen 710 on which the page loading of the Internet browser is in progress, the second electronic document may be a screen on which the loading is completed, and if a proximity input 730 is provided with respect to the loading screen, the electronic device 101 may continuously output the loading screen 710 through the display 150.

Returning to the method of FIG. 6, in step 650, the electronic device 101 determines whether the object selection input is detected within a predetermined time. Referring again to FIG. 7, the user selects (for example, by providing the object selection input which is a direct touch input to the relevant object 720) an object 720 of interest in the loading screen 710 where the switching is stopped due to the proximity input 730, and the electronic equipment 101 detects the relevant selection input. In step 660, when the object selection input is detected within a predetermined time, the electronic device 101 selects the object which corresponds to the position where the object selection input is provided, and outputs a third electronic document which corresponds to the selected object. In step 670, if the object selection input is not detected within a predetermined time, or if the proximity input is not detected (for example, if the proximity input exceeds the input range, or the proximity input is removed), the electronic device 101 releases the stopped operation of the screen switching and outputs the switched second electronic document.

That is, according to the present embodiment, the user may instantaneously stop the relevant screen at the moment when the screen switches, and the electronic device 101 may receive from the user an input for selecting the object of interest in the instantly stopped screen.

Figure 8:
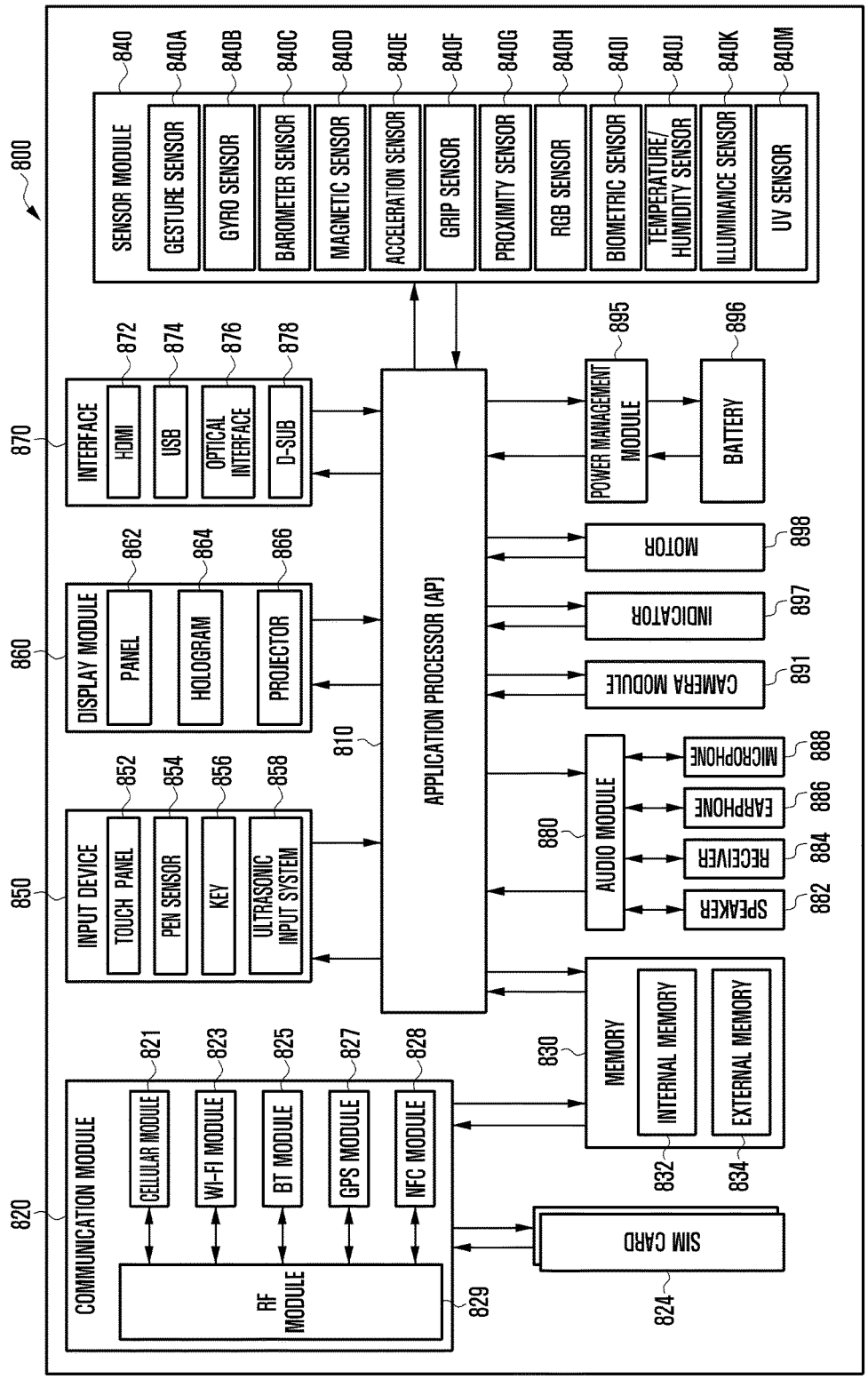
FIG. 8 is a block diagram illustrating an electronic device according to an embodiment of the present invention.

FIG. 8 illustrates a block diagram of an electronic device according to embodiments of the present invention. The electronic device 800 may constitute all or a part of the electronic device 101 shown in FIG. 1.

Referring to FIG. 8, the electronic device 800 includes at least one Application Processor (AP) 810, a communication module 820, at least one Subscriber Identity Module (SIM) card slot 824, a memory 830, a sensor module 840, an input module 850, a display 860, an interface 870, an audio module 880, a camera module 891, a power management module 895, a battery 896, an indicator 897, and a motor 898.

The AP 810 drives an operating system or an application program to control a plurality of hardware or software components connected to the AP 810, and performs processing and operations of various data including multimedia data. The AP 810 may be implemented as a System on Chip (SoC). The AP 810 may further include a Graphic Processing Unit (GPU).

The communication module 820 (e.g., the communication interface 160) performs data transmission/reception in communication with other electronic devices (e.g., the electronic device 104 and the server 106) connected to the electronic device 800 through a network. According to an embodiment, the communication module 820 includes a cellular module 821, a Wi-Fi module 823, a BT module 825, a GPS module 827, an NFC module 828, and a Radio Frequency (RF) module 829.

The cellular module 821 provides a voice call, a video call, an SMS service, and an Internet service through a communication network (e.g., LTE, LTE-A, CDMA, WCDMA, UMTS, WiBro, or GSM), and identifies and authenticates an electronic device in a communication network by using a SIM card. According to an embodiment, the cellular module 821 performs at least some of the functions that may be provided by the AP 810, such as a multimedia control function.

According to an embodiment, the cellular module 821 includes a Communication Processor, and may be implemented as an SoC. Although the cellular module 821, the memory 830, and the power management module 895 are shown as separate elements from the AP 810 in FIG. 8, the AP 810 may be implemented to include at least some of the aforementioned elements according to an embodiment.

According to an embodiment, the AP 810 or the cellular module 821 loads a command or data received from at least one of a non-volatile memory and other elements connected thereto into a volatile memory and processes the loaded command or data. The AP 810 or the cellular module 821 stores data received from or generated by at least one of other elements in a non-volatile memory.

Each of the Wi-Fi module 823, the BT module 825, the GPS module 827, and the NFC module 828 includes a processor for processing data transmitted or received through the corresponding module. Although the cellular module 821, the Wi-Fi module 823, the BT module 825, the GPS module 827, and the NFC module 828 are shown as separate blocks in FIG. 8, at least some (e.g., two or more) of the cellular module 821, the Wi-Fi module 823, the BT module 825, the GPS module 827, and the NFC module 828 may be included in one Integrated Chip (IC) or one IC package according to an embodiment. For example, at least some of processors corresponding to the cellular module 821, the Wi-Fi module 823, the BT module 825, the GPS module 827, and the NFC module 828, respectively, may be implemented as one SoC.

The RF module 829 performs data transmission/reception RF signal transmission/reception. Although not shown, the RF module 829 may include a transceiver, a Power Amp Module (PAM), a frequency filter, and a Low Noise Amplifier (LNA), for example. The RF module 829 may further include a component for transmitting/receiving an electromagnetic wave over the air in wireless communication, such as a conductor or a conducting wire. Although FIG. 8 illustrates that the cellular module 821, the Wi-Fi module 823, the BT module 825, the GPS module 827, and the NFC module 828 share one RF module 829, at least one of the cellular module 821, the Wi-Fi module 823, the BT module 825, the GPS module 827, and the NFC module 828 may perform RF signal transmission/reception through a separate RF module according to an embodiment.

The at least one SIM card may be inserted into at least one slot 824 formed in a certain position of the electronic device. The at least one SIM card includes unique identification information (e.g., Integrated Circuit Card IDentifier (ICCID)) or subscriber information (e.g., International Mobile Subscriber Identity (IMSI)).

The memory 830 includes an internal memory 832 or an external memory 834. The internal memory 832 includes at least one of a volatile memory (e.g., a Dynamic Random Access Memory (DRAM), a static RAM (SRAM), or a synchronous dynamic RAM (SDRAM)) and a non-volatile memory (e.g., a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or an NOR flash memory).

According to an embodiment, the internal memory 832 may be a Solid State Drive (SSD). The external memory 834 may further include a flash drive a Compact Flash (CF), a Secure Digital (SD), a Micro Secure Digital (Micro-SD), a Mini Secure Digital (Mini-SD), an extreme Digital (xD), or a memory stick. The external memory 834 may be functionally connected to the electronic device 800 through various interfaces. According to an embodiment, the electronic device 800 may further include a storage device (or storage medium) such as a hard drive.

The sensor module 840 measures a physical quantity or detects an operation state of the electronic device 800 and converts the measured or detected information into an electronic signal. The sensor module 840 includes at least one of a gesture sensor 840A, a gyro sensor 840B, an atmospheric pressure (i.e., barometer) sensor 840C, a magnetic sensor 840D, an acceleration sensor 840E, a grip sensor 840F, a proximity sensor 840G, a color sensor 840H (e.g., a Red, Green and Blue (RGB) sensor), a biometric sensor 840I, a temperature/humidity sensor 840J, a light (i.e., illuminance) sensor 840K, and an UltraViolet (UV) sensor 840M. Although not shown, the sensor module 840 may further include an E-nose sensor, an electromyography (EMG) sensor, an ElectroEncephaloGram (EEG) sensor, an ElectroCardioGram (ECG) sensor, an InfraRed (IR) sensor, an iris scanner, and/or a fingerprint sensor. The sensor module 840 may further include a control circuit for controlling one or more sensors included therein.

The input module 850 includes a touch panel 852, a (digital) pen sensor 854, a key 856, and an ultrasonic input unit 858. The touch panel 852 that recognizes a touch input includes at least one of a capacitive touch panel, a resistive touch panel, an infrared touch panel, and an acoustic wave touch panel. The touch panel 852 may further include a control circuit. When the touch panel is a capacitive touch panel, the touch panel may recognize a physical contact or proximity. The touch panel 852 may further include a tactile layer, in which case the touch panel 852 provides a tactile response to a user.

The (digital) pen sensor 854 may be implemented using a means identical or similar to a means for receiving a touch input from a user or using a separate recognition sheet. The key 856 includes a physical button, an optical key, or a keypad. The ultrasonic input unit 858 identifies data by generating an ultrasonic signal through an input tool and detecting a sonic wave through a microphone in the electronic device 800, and is capable of wireless recognition. According to an embodiment, the electronic device 800 may also receive a user input from an external device (e.g., computer or server) connected thereto by using the communication module 820.

The display 860 includes a panel 862, a hologram unit 864, and a projector 866. The panel 862 is a Liquid Crystal Display (LCD) or an Active Matrix-Organic Light Emitting Diode (AM-OLED), and is implemented to be flexible, transparent, or wearable. The panel 862 may also be incorporated into one module together with the touch panel 852. The hologram unit 864 displays a stereoscopic image in the air by using light interference. The projector 866 displays an image by projecting light onto a screen which may be located inside or outside of the electronic device 800. According to an embodiment, the display 860 may further include a control circuit for controlling the panel 862, the hologram unit 864, and the projector 866.

The interface 870 includes a High-Definition Multimedia Interface (HDMI) 872, a Universal Serial Bus (USB) 874, an optical interface 876, and a D-subminiature (D-sub) 878. The interface 870 may be included in the communication interface 160 shown in FIG. 1. The interface 890 may include a Mobile High-definition Link (MHL) interface, an SD card/MultiMedia Card (MMC) interface, or an Infrared Data Association (IrDA) interface.

The audio module 880 provides bidirectional conversion between a sound and an electronic signal. At least some elements of the audio module 880 may be included in the input/output interface 140 shown in FIG. 1. The audio module 880 processes sound information input or output through a speaker 882, a receiver 884, earphones 886, and the microphone 888.

The camera module 891 can take both still and moving images, and although not shown, may include one or more image sensors (e.g., a front sensor or a rear sensor), a lens, an Image Signal Processor (ISP), and a flash (e.g., a Light Emitting Diode (LED) or xenon lamp).

The power management module 895 manages power of the electronic device 800. Although not shown, the power management module 895 may include a power management integrated circuit (PMIC), a charger IC, or a battery or fuel gauge.

The PMIC may be mounted in an IC or an SoC semiconductor. Charging methods may be classified into wired charging and wireless charging. The charger IC charges a battery, and prevents an overvoltage or excess current from being induced or flowing from a charger. According to an embodiment, the charger IC performs at least one of wired and wireless charging. Examples of wireless charging include magnetic resonance charging, magnetic induction charging, and electromagnetic charging, and an additional circuit such as a coil loop, a resonance circuit, and may additionally require a rectifier.

A battery gauge measures the residual capacity, charge in voltage, current, or temperature of the battery 896. The battery 896 stores or generates electricity, and supplies power to the electronic device 800 by using the stored or generated electricity. The battery 896 includes a rechargeable battery or a solar battery.

The indicator 897 displays a specific status of the electronic device 800 or a part thereof a boot-up status, a message status, or a charging status. The motor 898 converts an electrical signal into a mechanical vibration. Although not shown, the electronic device 800 includes a processing unit (e.g., GPU) for supporting a mobile TV, which processes media data pursuant to a certain standard such as Digital Multimedia Groadcasting (DMB), Digital Video Broadcasting (DVB), or media flow.

Each of the above described elements of the electronic device according to the present invention may be formed by one or more components, and the names of the corresponding elements may vary according to the type of the electronic device. The electronic device according to the present invention includes at least one of the above described elements, and may exclude some of the elements or further include other additional elements. Some of the elements of the electronic device according to the present invention may be coupled to form a single entity while performing the same functions as those of the corresponding elements before the coupling.

The term "module" as used in the present invention may indicate a unit including one of hardware, software, and firmware or any combination thereof. The "module" may be interchangeable with the term "unit", "logic", "logical block", "component", or "circuit", may be the smallest unit of an integrated component or a part thereof, may be the smallest unit that performs one or more functions or a part thereof, and may be mechanically or electronically implemented. For example, the "module" according to the present invention may include at least one of an Application-Specific Integrated Circuit (ASIC) chip, a Field-Programmable Gate Array (FPGA), and a programmable-logic device for performing certain operations, which are now known or will be developed in the future.

According to various embodiments, at least some of the devices (for example, modules or functions thereof) or the method (for example, operations) according to the present invention may be implemented by a command stored in a computer-readable storage medium in a programming module form. When the instruction is performed by at least one processor (for example, the processor 120), the at least one processor performs a function corresponding to the instruction. The computer-readable storage medium may be the memory 130. At least some of the programming modules may be implemented by the processor 120 include, and include a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform an operation of the present invention, and vice versa.

The programming module according to the present invention includes one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Some operations may be executed according to another order or may be omitted, or other operations may be added.

The embodiments disclosed in the specification and drawings are merely presented to easily describe technical contents of the present invention and assist in the understanding of the present invention and are not intended to limit the scope of the present invention. Therefore, all changes or modifications derived from the technical idea of the present invention as well as the embodiments described herein should be interpreted to belong to the scope of the present invention.

What is claimed is:

1. A method for controlling an electronic device, comprising:
switching an electronic document, which is output through a display functionally connected to the electronic device, from a first electronic document having a first object at an arbitrary position on the display when the first electronic document is being displayed on the display to a second electronic document having a second object at the arbitrary position of the display when the second electronic document is, and the first document is not, being displayed on the display;

receiving an input corresponding to the arbitrary position of the display after switching from the first electronic document to the second electronic document is completed;

determining one of the first electronic document and the second electronic document as corresponding to the input, wherein the input is determined to correspond to the first electronic document when the input is received within a predetermined time after the output is switched to the second electronic document and the input is determined to correspond to the second electronic document when the input is received after the predetermined time after the output is switched to the second electronic document;

when the input corresponding to the arbitrary position is received within the predetermined time after the output is switched to the second electronic document, the input causes the first object to be selected; and when the input corresponding to the arbitrary position is received after the predetermined time after the output is switched to the second electronic document, the input causes the second object to be selected.

2. The method of claim 1, wherein the determining comprises:

determining the input as corresponding to the first electronic document when the input is received while the first electronic document is being output.

3. The method of claim 1, further comprising:

providing a selection menu which associates the input with either the first electronic document or second electronic document, when the input is received within a predetermined time after the second electronic document is output.

4. The method of claim 1, further comprising:

executing a function corresponding to the selected first or second object.

5. The method of claim 4, wherein the executing comprises:

outputting through the display, when the first or second object is a link object, a third electronic document corresponding to the link object.

6. The method of claim 1, wherein the switching comprises:

storing display information of the first electronic document in a memory functionally connected to the electronic device.

7. The method of claim 1, wherein the input comprises a first selection input and a second selection input with respect to the first electronic document, and the method further comprises:

stopping the switching from the first electronic document to the second electronic document based on the first selection input; and releasing the stopped switching when the second selection input is not received within a predetermined time after the first selection input is received, wherein the second electronic document is output in a case when the first selection input is not within a time range designated on the display.

8. The method of claim 7, wherein the first selection input is a hovering input that is farther away from the display than the second selection input on the display.

9. The method of claim 8, wherein the first or second object is selected corresponding to a position where the second selection input is received, based on the first electronic document.

10. An electronic device comprising:

a display configured to display a first electronic document having a first object at an arbitrary position on the display when the first electronic document is being displayed on the display or a second electronic document having a second object at the arbitrary position on the display when the first electronic document is, and the first document is not, being displayed on the display; and a processor configured to:

output the first electronic document through the display, switch the output from the first electronic document to the second electronic document, receive an input corresponding to the arbitrary position of the display after switching from the first electronic document to the second electronic document is completed, determine the first electronic document or the second electronic document as corresponding to the input, wherein the input is determined to correspond to the first electronic document when the input is received within a predetermined time after the output is switched to the second electronic document and the input is determined to correspond to the second electronic document when the input is received after the predetermined time after the output is switched to the second electronic document, when the input corresponding to the arbitrary position is received within the predetermined time after the output is switched to the second electronic document, the input causes the first object to be selected, and when the input corresponding to the arbitrary position is received after the predetermined time after the output is switched to the second electronic document, the input causes the second object to be selected.

11. The apparatus of claim 10, wherein the processor is configured to determine the input as corresponding to the first electronic document when the input is received while the first electronic document is being output.

12. The apparatus of claim 10, wherein the processor is configured to provide a selection menu which associates the input with either the first electronic document or second electronic document when the input is received within a predetermined time after the second electronic document is output.

13. The apparatus of claim 10, wherein the processor is configured to execute a function corresponding to the selected first or second object.

14. The apparatus of claim 13, wherein the processor is configured to output, through the display, when the first or second object is a link object, a third electronic document corresponding to the link object.

15. The apparatus of claim 10, further comprising a memory configured to store display information of the first electronic document.

16. The apparatus of claim 10, wherein the input comprises a first selection input and a second selection input with respect to the first electronic document, and wherein the processor is configured to stop the switching from the first electronic document to the second electronic document based on the first selection input, and release the stopped switching when the second selection input is not received within a predetermined time after the first selection input is received, wherein the second electronic document is output in a case when the first selection input is not within a time range designated on the display.

17. The apparatus of claim 16, wherein the first selection input is a hovering input that is farther away from the display than the second selection input on the display.

18. The apparatus of claim 17, wherein the processor is configured to select the first or second object corresponding to a position where the second selection input is received, based on the first electronic document.

* * * * *